(12) United States Patent
Goldman et al.

(10) Patent No.: US 6,467,688 B1
(45) Date of Patent: Oct. 22, 2002

(54) SHEET FED PRINTER FOR A HAND HELD TERMINAL

(75) Inventors: Ron Goldman, Cold Spring Harbor; Vincent P. Luciano, Port Jefferson, both of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/572,528

(22) Filed: May 17, 2000

(51) Int. Cl.[7] .............................. G06K 7/10; G06K 7/06
(52) U.S. Cl. ................. 235/472.01; 235/375; 235/441; 235/462.01
(58) Field of Search ................. 235/462 AL, 472 ALL, 235/496, 454, 375, 383, 381, 380, 382, 379, 441; 400/103, 104, 88

(56) References Cited

U.S. PATENT DOCUMENTS

| | | | | |
|---|---|---|---|---|
| 4,650,975 A | * | 3/1987 | Kitchener | 235/375 |
| 4,734,710 A | * | 3/1988 | Sato et al. | 346/76 |
| 4,857,716 A | * | 8/1989 | Gombrich | 235/462 |
| 4,944,581 A | * | 7/1990 | Ichikawa | 350/641 |
| 5,047,615 A | * | 9/1991 | Fukumoto et al. | 235/432 |
| 5,371,348 A | * | 12/1994 | Kumar et al. | 235/472 |
| 5,386,106 A | * | 1/1995 | Kumar | 235/462 |
| 5,489,773 A | * | 2/1996 | Kumar | 235/462 |
| 5,493,107 A | * | 2/1996 | Guppta et al. | 235/441 |
| 5,532,466 A | * | 7/1996 | Konno et al. | 235/441 |
| 5,542,487 A | * | 8/1996 | Schultz et al. | 178/4.1 |
| 5,744,791 A | * | 4/1998 | Isaac et al. | 235/472 |
| 5,804,807 A | * | 9/1998 | Murrah et al. | 235/383 |
| 5,969,327 A | * | 10/1999 | Metlitsky et al. | 235/472 |
| 6,006,100 A | * | 12/1999 | Koenck et al. | 455/466 |
| 6,068,420 A | * | 5/2000 | Ausin et al. | 400/693 |
| 6,158,662 A | * | 12/2000 | Khan et al. | 235/472.01 |
| 6,325,481 B1 | * | 12/2001 | Pietz et al. | 347/19 |
| 6,340,115 B1 | * | 1/2002 | Swartz | 235/462.45 |

FOREIGN PATENT DOCUMENTS

| | | | | |
|---|---|---|---|---|
| JP | 402077647 A | * | 3/1990 | 426/524 |
| JP | 02001096846 A | * | 4/2001 | |

* cited by examiner

Primary Examiner—Thien M. Le
(74) Attorney, Agent, or Firm—Ira J. Schaefer, Esq.; Mitchell S. Feller, Esq; Clifford Chance US LLP

(57) ABSTRACT

A hand held terminal has a display, a keying input, a printer, a processor for receiving information from the keying input and for directing information onto the display and to the printer and a housing for the keying input, display and processor. The printer is directly mechanically connected to the housing and the printer is a sheet fed printer.

17 Claims, 2 Drawing Sheets

SHEET FED PRINTER FOR A HAND HELD TERMINAL

BACKGROUND OF THE INVENTION

Present invention relates to hand held terminals and printers for hand held terminals. Hand held terminals which are generally portable and have a display and a key input which can be either manually actuated pushbutton keys or touch screen keys such as those used on a Palm computer. In order to print from a hand held terminals one may download the information to a host computer, some hand held terminals have an RS-232 communications port which enables data to be sent from the terminal to a printer by a cable and some terminals have a IR port that can communicate data to a printer.

Small printers have been available for terminals, these printers having a roll of paper which is fed through the printer during printing.

SUMMARY OF THE INVENTION

The main object of the present invention is to provide a sheet fed printer for a hand held terminal and in particular, a sheet fed printer which can either be connected to the housing of the terminal or be built into the housing of the terminal.

The sheet fed printer preferably receives sheets of paper fed one sheet at a time. Paper can be maintained in a stack or in a pad and each sheet is removed from the pad as necessary. The benefit of this printer is that paper can be easily stored separately from the terminal.

The device preferably uses the surface of at least one of a display and a keyboard to support the paper on before it is fed through the printer.

The printer is preferably a thermal printer, an inkjet printer, a bubblejet printer, an impact printer or similar printers which can be constructed to have similar height and width as a hand held terminal.

These and other objects and advantages of the present invention will be disclosed in more detail with reference to the attached drawings, wherein;

DETAIL DESCRIPTION OF THE INVENTION

Figure 1:
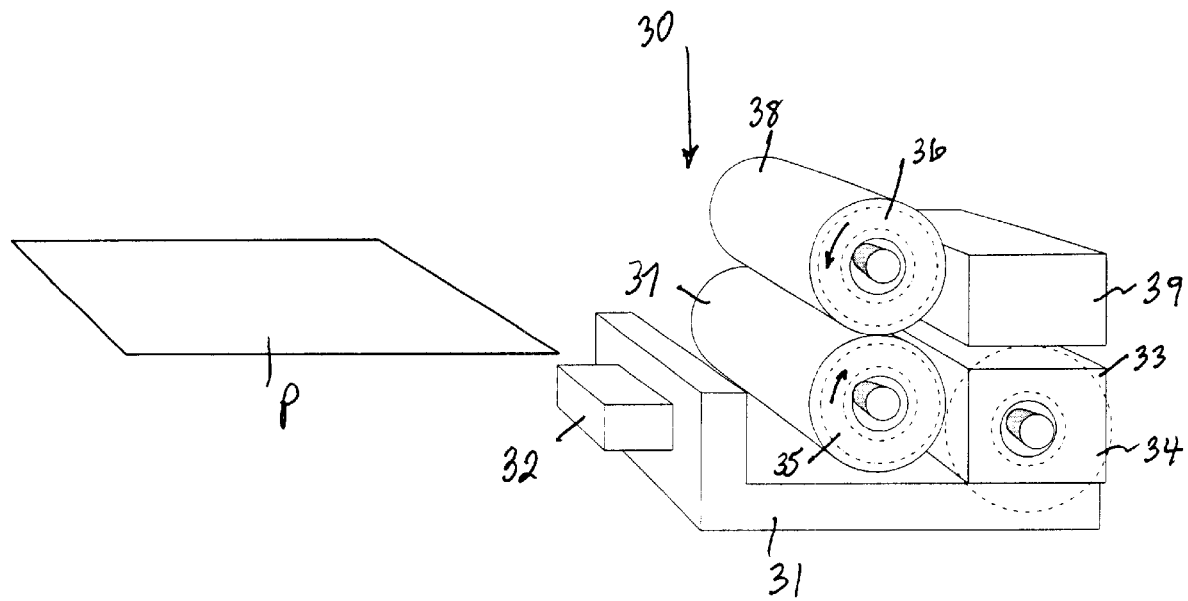
FIG. 1 is a drawing of a printer for a hand held terminal in accordance with the present invention.

A printer according to the present invention is showing in FIG. 1. While the embodiment that is illustrated is a thermal printer, it is understood that any type of printer may be used as long as it can be configured in the desired form factor. The printer 30 includes a mounting support 31 which has a connector 32 for effecting both an electrical and a mechanical connection to a hand held terminal. The electrical wires from connector 32 to the other elements of the printer are not shown.

The printer comprises a motor 33 which drives a gear 34 which in turn engages gears 35 and 36 on rollers 37 and 38 respectively. Mounted above the motor 33 is a thermal print head 39. Specially treated thermal paper sheet P is then fed between the rollers which, when driven by the motor, effect movement of the sheet under the print head 39 and in effect printing thereon one sheet at a time.

Alternatively, a rigid card stock sheet can be pushed by a user, winding a spring, and printing occurs when the sheet is ejected using the force of the unwinding spring. In another embodiment, card stock is pushed or pulled through the mechanism manually by a user. A sensor can vary the print speed to adjust for variations in feed speed. The printer will have a dead zone on the print medium to allow for gripping by a user.

Figure 2:
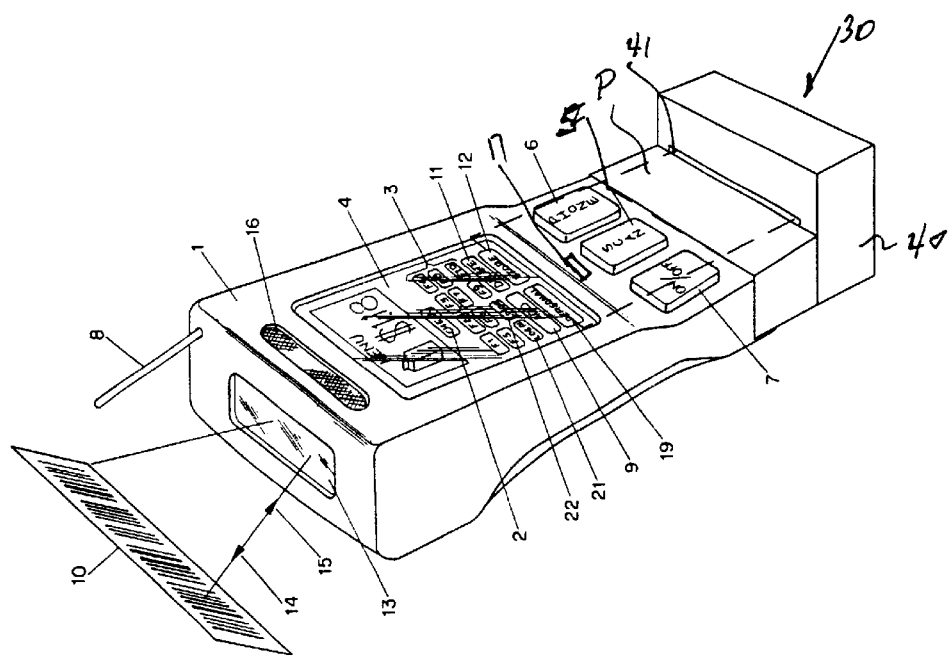
FIG. 2 shows a printer connected to a hand held terminal in accordance with the present invention.

FIG. 2 shows a printer 30 in a housing 40 and connecting to a hand held portable shopping terminal. The portable shopping terminal shown in FIG. 2 is described in more detail in U.S. Pat. No. 5,923,735, the disclosure of which is hereby incorporated by reference herein.

The terminal in FIG. 2 is a portable communications terminal 1 in accordance with the invention (various minor components of the portable communications terminal have been omitted for simplicity). The terminal is one of the elements of the invented self-checkout system. Power to the device is controlled by an on/off toggle key 7. As used herein, the term "key" represents a physical push key which can be activated either manually or mechanically. Also, as used herein, the term "button" represents a touch sensitive, software programmable area of the touch screen display. The on/off key may be activated. The on/off key 7 powers up the portable communications terminal 1 when the terminal is in the off state, and powers down the device 1 when it is in the on state. There are two basic operating modes: a phone mode and a scan mode. When operating in the cellular phone mode, the portable communications terminal 1 is designed to operate as a cellular phone in accordance with the cell phones well known in the art. (Refer to U.S. Pat. Nos. 4,697,281, 4,837,800, 4,887,265). The scan mode is subdivided into a personal scan mode and a store scan mode. Store scan mode is the mode used during the self-checkout transaction.

At power-up, the device wakes up in either the phone mode or the personal scan mode. The phone key 6 places the portable communications terminal 1 into the cellular phone operating mode. The scan key 5 turns on the scan mode and allows the portable communications terminal 1 to operate as a bar code scanning terminal. Bar code scanners and scanning terminals are well known in the art. (Refer to U.S. Pat. Nos. 4,850,009, 5,015,833, 5,021,641, 5,414,251).

A touch screen 4, a speaker 16 and a microphone 17, provide visual, tactile and audio operator feedback. The microphone 17 converts acoustical voice signals into electrical signals. It is used heavily during the phone operation, but may also be utilized by a user to send voice commands to the device during scan mode operation.

Speaker 16 converts electrical signals into acoustical signals that are sent to an operator. It is used heavily during the phone mode operation, but could also be used to send the system status, via recorded messages, beeps, or music, to the user during scan mode operation.

The touch screen 4 displays information and system status, and allows the user to select different system options. Depending on the operating mode, the touch screen displays different software menus. In addition, the touch screen 4 displays different software controlled buttons or graphic control representations. Software controlled buttons change their functionality depending on the mode of the device operation. Software controlled buttons are divided into two types: user programmable software controlled touch screen buttons and mode dedicated touch screen buttons. The touch screen 4 shows the display of items when the terminal is in the scan mode of operation. Reference numeral 3 designates a group of user programmable software controlled buttons F1 through F10. By programming the functionality of the buttons F1 through F10, a user can customize the display. Personal scan button 19, store scan button 12, add button 9, delete button 11, check button 2, log-in button 21, and log-out button 22 are mode dedicated touch screen buttons. They appear on the display whenever the terminal is in the scan mode of operation, and cannot be changed by the user. Personal scan button 19 is utilized when the user wants to come out of a store scan operating mode and wants to enter the personal scan mode. Store scan button 12 is utilized when the user wants to come out of the personal scan mode and wants to enter the store scan mode. When either the personal scan mode or the store scan mode is enabled, the add button 9, the delete button 11 and the check button 2 appear on the touch screen. Selecting either one of the buttons activates scanning. Scanning may also be activated by the add, the delete, or the check voice commands into the microphone. The log-in button 21 is used to establish cellular communication channel between the terminal and a remote party during the self-checkout transaction. The log-out button 22 is used to terminate the cellular communication channel between the terminal and the remote party at the end of the self-checkout transaction.

The cellular portable communications terminal 1 is designed to ease the aiming at a bar code symbol 10, when the user is attempting to scan the bar code. When scanning is activated by the add button 9, the delete button 11, the check button 2, or the voice commands, a laser beam 14 exits the terminal through a light transmitting window 13 and is reflected off of the bar code 10. The reflected light 15 is detected and processed by the circuitry inside the terminal.

The terminal uses an antenna 8 to communicate with the remote party via a cellular telephone network. When the device 1 is used as a cellular phone, the antenna 8 mostly transmits and receives voice data. When the device 1 is operated in the store scan mode, the antenna 8 transmits and receives bar code, voice and product data.

Printing is effected by placing the terminal in a print mode from a menu on the display of the terminal. The scan button 12 can have the added functionality of starting to print. The sheet P is then fed through slot 41 in the housing 40 and comes out the other side through a similar slot. In this manner, the shopper can keep a hard copy record of the shopping list being maintained.

Figure 3:
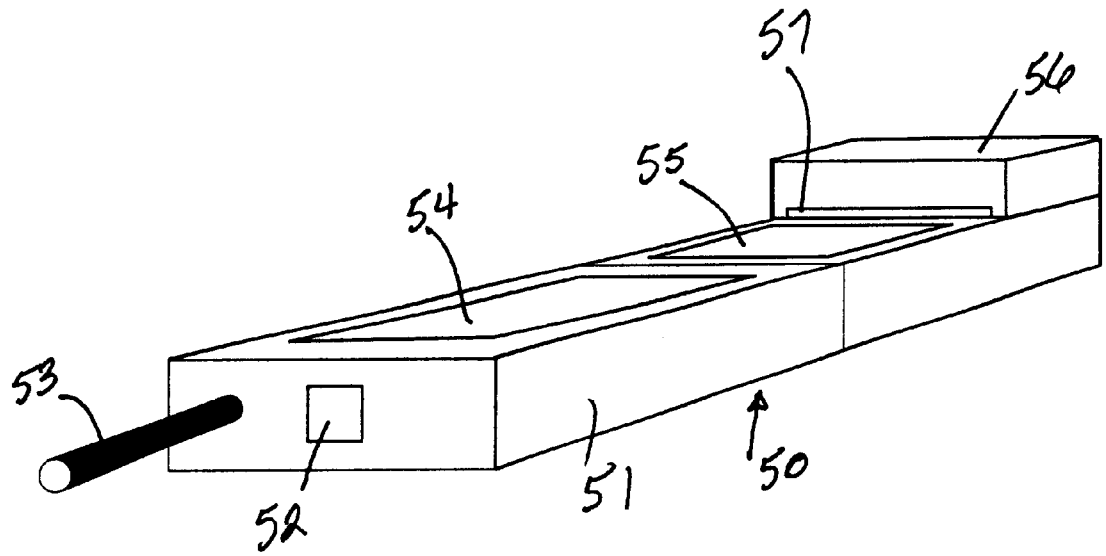
FIG. 3 shows a printer built into a terminal in accordance with the present invention.

FIG. 3 illustrates a terminal 50 with the printer built in. Terminal 50 has housing 51 in which is incorporated a scan engine which scans through window 52 and a wireless communications circuit which utilizes antenna 53. The terminal also has a display 54 and a keyboard 55. The printer is in housing portion 56 and includes a slot 57 through which sheets of paper can pass for being printed which passes through the housing and out the back thereof.

Figure 4:
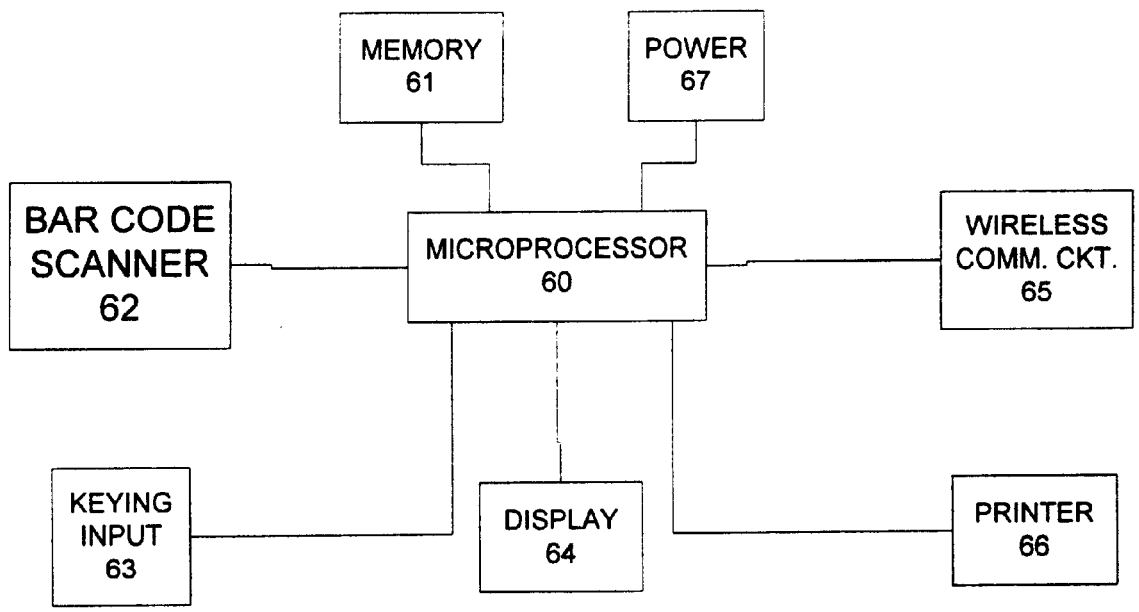
FIG. 4 is a schematic drawing of the circuitry of the terminal according to the invention.

FIG. 4 shows a schematic of the circuitry that interacts with the printer to print data. As shown, a microprocessor 60 receives inputs from a keying input 63 and from bar code scanner 62 and stores data in memory 61. The microprocessor also can display data on the display 64 or output data to printer 66. Power is supplied to the microprocessor and the remaining elements of the system via power input 67 which is a battery or a rechargeable battery. A wireless communication circuit can be a Bluetooth communication module, a WAN circuit, a LAN circuit, etc.

The bar code scanner can be a laser bar code scanner, CCD imager, or other scanner and can be retro-reflective or non-retroreflective.

The printer is illustrated as a terminal printer, however, it is clear that other conventional printers which can be miniaturized can also be used, such as inkjet, bubblejet, impact, etc.

What is claimed is:

1. A hand held terminal comprising:

a housing;

a display in the housing;

a keying input in the housing;

a bar code scanner for inputting information;

a light transmitting window in a front portion of the terminal allowing light to pass to and from the scanner;

a printer;

a processor in the housing for receiving information from the keying input and the scanner and for directing information onto the display and to the printer;

the housing having an electrical and mechanical connector extending from a back portion thereof;

wherein the printer is directly electrically and mechanically connected to the connector extending from the housing, the printer, when connected, is on an opposite side of the terminal from the light transmitting window and wherein the printer is a sheet fed printer.

2. The terminal according to claim 1, wherein the bar code scanner is disposed in the housing.

3. The terminal according to claim 1, wherein a rear portion of the bar code scanner is directly mechanically connected to a front portion of the housing.

4. The terminal according to claim 1, wherein the printer has a thermal print head.

5. The terminal according to claim 1, wherein the printer has a ink jet print head.

6. The terminal according to claim 1, wherein the printer has a bubble jet print head.

7. The terminal according to claim 1, wherein the printer has an impact printer print head.

8. The terminal according to claim 1, wherein the housing is configured so support a sheet to be fed on at least one of the keying input and the display.

9. The terminal according to claim 1, wherein the printer is fed one sheet at a time.

10. A hand held terminal comprising:

a housing;

a display in the housing;

a keying input in the housing;

a printer in a back portion of the housing;

a bar code scanner for inputting information;

a light transmitting window in a portion front of the terminal allowing light to pass to and from the scanner;

a processor for receiving information from the keying input and the scanner and for directing information onto the display and to the printer;

wherein the printer is on an opposite side of the terminal from the light transmitting window and is a sheet fed printer.

11. The terminal according to claim 10, wherein the bar code scanner is disposed in the housing.

12. The terminal according to claim 10, wherein a rear portion of the bar code scanner is directly mechanically connected to a front portion of the housing.

13. The terminal according to claim 10, wherein the printer has a thermal print head.

14. The terminal according to claim 10, wherein the printer has a ink jet print head.

15. The terminal according to claim 10, wherein the printer has a bubble jet print head.

16. The terminal according to claim 10, wherein the housing is configured so support a sheet to be fed on at least one of the keying input and the display.

17. The terminal according to claim 10, wherein the printer is fed one sheet at a time.

* * * * *